United States Patent [19]
> Jaco, Jr.

[11] 3,859,799

[45] Jan. 14, 1975

[54] LANDFILL DISPOSAL OF POWER PLANT WASTES

[75] Inventor: Charles M. Jaco, Jr., Pittsburgh, Pa.

[73] Assignee: Dravo Corporation, Pittsburgh, Pa.

[22] Filed: Jan. 23, 1973

[21] Appl. No.: 326,025

[52] U.S. Cl............................ 61/35, 210/42, 210/83
[51] Int. Cl............................ C02c 3/00, C02c 1/40
[58] Field of Search ............. 61/35, 12; 210/83, 73, 210/42, 10, 53; 71/12

[56] References Cited
UNITED STATES PATENTS

| | | | |
|---|---|---|---|
| 1,103,351 | 7/1914 | Dorr | 61/35 |
| 2,034,460 | 3/1936 | Darcby | 210/53 |
| 3,226,319 | 12/1965 | Shick | 210/53 |
| 3,561,598 | 2/1971 | Goldberg | 210/10 |
| 3,718,003 | 2/1973 | Cook et al. | 61/35 |

FOREIGN PATENTS OR APPLICATIONS

| | | | |
|---|---|---|---|
| 21,793 | 7/1970 | Japan | 210/42 |
| 22,778 | 8/1913 | Great Britain | 210/42 |

OTHER PUBLICATIONS

American Sewerage Practice, by L. Metcalf and H. Eody, Vol. III (Disposal or Sewage) pages 142, 143, 147, 697, 699, 700, McGraw Hill Book Co., 1935 U.S.P.O. Scientific Library.

*Primary Examiner*—Paul R. Gilliam
*Assistant Examiner*—Alex Grosz
*Attorney, Agent, or Firm*—Parmelee, Miller, Welsh & Kratz

[57] ABSTRACT

A method of operating a landfill for disposing of power plant wastes including sulfur-dioxide removal system wastes and fly ash waste. The sulfur-dioxide removal system wastes comprise a sludge containing varying amounts of finely divided alkaline-sulfur composition solids which must be stabilized to serve as landfill material. The fly ash is preferably included with the sludge to promote stabilization. The sludge is admixed with a cementitious material and deposited in an initial holding basin. The admixture is permitted to settle to dewater somewhat and to partially stabilize the solids. The settled solids are removed from the bottom of the basin and deposited at a secondary dewatering and stabilizing zone whereat the water content may be further reduced and the solids stabilized. The stabilized solids are then moved to the landfill zone.

4 Claims, 1 Drawing Figure

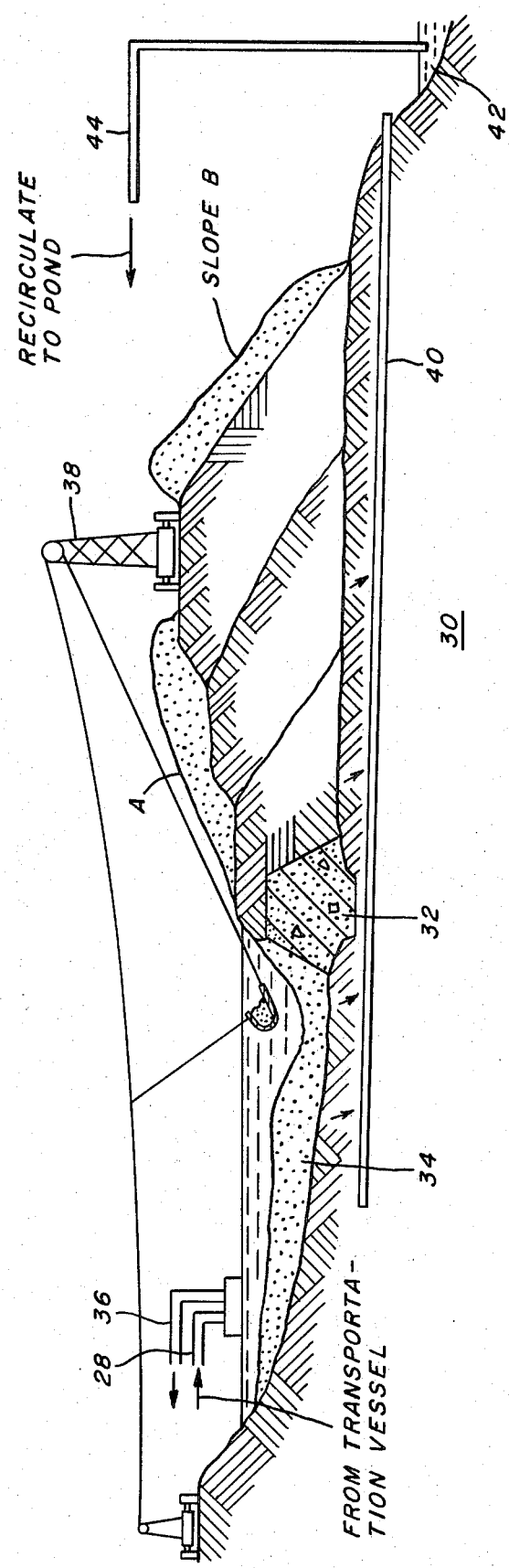

LANDFILL DISPOSAL OF POWER PLANT WASTES

BACKGROUND OF THE INVENTION

The use of sulfur containing fuel at power plants has produced a sulfur dioxide atmospheric pollution problem. Recent regulations call for the severe restriction and curtailment of sulfur dioxide pollution. Several of the sulfur dioxide removal systems themselves generate a waste product which must be disposed of. The waste product comprises alkaline-sulfur composition solids containing sludge or slurry which has a high water content and which resists dewatering and stabilizing. This is because of the chemical and physical nature of the solids within the sludge.

The sludge solids principally comprise calcium sulfite, and other calcium compounds. These materials form finely divided particles which comprise randomly attached platelets of these constituents. These particles have a very high surface to volume ratio and retain large amounts of water.

The well known combusted coal waste product, fly ash, has presented a much simpler disposal problem. This is because of the favorable chemical and physical nature of fly ash. Fly ash is largely silico-alumina compounds or mixtures and can be easily stabilized with additions of lime as is well known, since such a mixture is comprised of the three basic cement elements calcium, silicon, and alumina and will have cementitious qualities. The fly ash particle is also a finely divided sphere and dewatering is not a problem even though retention of some water is desirable for stabilizing fly ash.

The sulfate-sulfite containing sludges generated by sulfur dioxide scrubber systems will remain as a sludge if deposited in a holding basin. It is very desirable to be able to stabilize these solids containing sludge and permit use thereof for a landfill operation.

SUMMARY OF THE INVENTION

A method of operating a landfill for stabilizing finely divided solids entrained in sludge generated by a sulfur dioxide removal system. The sludge is admixed with a predetermined amount of finely divided cementitious material and deposited in an initial holding basin. The admixed sludge is retained in the holding basin for a time sufficient to partially settle and partially stabilize the solids therein, with the supernatent liquid being removed from the basin. The solids are removed from the bottom of the holding basin and deposited in a secondary dewatering and stabilizing zone, where the solids are further dewatered and stabilized. The substantially stabilized solids are then transferred and deposited as a landfill material.

BRIEF DESCRIPTION OF THE DRAWING

The sole FIGURE is a schematic representation of the landfill operations of the present invention.

DESCRIPTION OF THE PREFERRED EMBODIMENT

The landfill operation 30 shown in the FIGURE comprises an initial holding basin 34, which is fed from fill pipe 28 which is used to transport the solids containing sludge to the landfill site. The fill basin can be established by building a small initial toe dam 32. The sludge is admixed with cementitious material in an amount of about 1–10 percent by weight of the solids contained in the sludge. The solids content of the sludge arriving via fill pipe 28 will be of the order of 30–50 weight present. In general the higher the solids content the less cementitious material required to stabilize the resultant product. The sludge developed by typical sulfur dioxide removal system either directly in the scrubber or in a regenerative system contains substantial quantities of calcium sulfite, calcium sulfate, and other calcium compounds. These calcium-sulfur composition solids form particles of randomly attached crystal platelets which are finely divided and exhibit a low mass to volume ratio. These particles will not settle out normally to a water content of less than about 40–50 percent by weight. The sludge may contain coal fly ash as it is generated if the flue gases are passed through the wet scrubber to remove the fly ash. The fly ash can be collected by a dry precipitator and admixed with the sludge. It has been discovered that a fly ash content of at least 25 weight percent of the total solids weight in the sludge is desirable in achieving a stabilized landfill material.

The partially settled solids are moved from the bottom of the holding basin 34 by a drag cable material moving apparatus 38, and deposited above the toe dam 32 to zone A which is a secondary dewatering and stabilizing zone. Several earlier landfill layers are shown below zone A from earlier operations. The material at zone A is substantially stabilized as a result of further drainage of water therefrom, and includes conversion of free water to hydrated water as the cementitious material cures. The substantially stabilized material can then be moved to landfill zone B as the start of another landfill zone.

The landfill site is prepared by providing an underdrain 40, which collects any fluid leached from the landfill and collects it in pond 42, which is recirculated back via pipe 44 to the holding basin 34. Various cementitious materials have been found useful including lime, Portland cement, cement bag house dust, and steel making residue slag. When the material is particularly high in silica and alumina an accelerating agent such as lime can be added to promote cementitious reaction. These cementitious materials are preferably added to the sludge or slurry in an amount of 1–10 percent by weight of the solids weight, as the material is deposited in holding basin 34. The admixed material will settle to some extent in holding basin 34, and supernatent fluid can be pumped back for reuse in slurry formation through pipe 36.

A holding time of about 2–3 weeks in the initial basin 34, can be followed by holding the material at zone A for another week. The material is then substantially stabilized and can be placed at zone B. The various holding times can, of course, be larger if the initial sludge has a high water content and if the percentage of cementitious material admixed is low. The holding times can likewise be shortened if the sludge has a lower water content and a higher percentage of cementitious material is added.

I claim:

1. Method of operating a landfill for dewatering and stabilizing finely divided solids-containing sludges transported thereto, said solids comprising fly ash and calcium-sulfur containing compositions, which solids are the waste products from a combination system utilizing sulfur containing fuel, wherein the landfill comprises an initial holding basin, a secondary dewatering and stabilizing zone, and a stabilized landfill zone, which method comprises
  a. admixing a predetermined amount of finely divided cementitious material with the sludge;
  b. depositing the admixed solids containing sludge in the initial holding basin;
  c. retaining the admixed sludge in said holding basin for a predetermined time to settle and partially stabilize the solids;
  d. removing the settled and partially stabilized solids from the holding basin and depositing same in the secondary gravity dewatering and stabilizing zone and retaining same thereat to substantially complete the dewatering and stabilizing;
  e. removing the substantially stabilized solids therefrom and depositing the solids in the stabilized landfill zone.

2. The method specified in claim 1, wherein the cementitious material is in an amount of about 1-10 percent by weight of the total solids weight in the admixed sludge, and is selected from the group consisting of lime, Portland cement, cement bag house dust, and steel making residue slag.

3. The method specified in claim 1, wherein the holding time in the initial holding basin is about 2-3 weeks, and the holding time at the secondary dewatering and stabilizing zone is about 1 week.

4. The method specified in claim 1, wherein the settled and partially stabilized solids removed from the holding basin are subjected to a dewatering processing for at least several minutes before being deposited at the secondary dewatering and stabilizing zone.

* * * * *